US008572289B1

(12) United States Patent
Johnson

(10) Patent No.: US 8,572,289 B1
(45) Date of Patent: Oct. 29, 2013

(54) SYSTEM, METHOD AND COMPUTER PROGRAM PRODUCT FOR STATELESS OFFLOADING OF UPPER LEVEL NETWORK PROTOCOL OPERATIONS

(75) Inventor: Michael W. Johnson, Petaluma, CA (US)

(73) Assignee: Nvidia Corporation, Santa Clara, CA (US)

( * ) Notice: Subject to any disclaimer, the term of this patent is extended or adjusted under 35 U.S.C. 154(b) by 1082 days.

(21) Appl. No.: 11/407,322

(22) Filed: Apr. 18, 2006

Related U.S. Application Data

(63) Continuation-in-part of application No. 10/742,352, filed on Dec. 19, 2003, and a continuation-in-part of application No. 10/741,681, filed on Dec. 19, 2003, now Pat. No. 7,260,631.

(60) Provisional application No. 60/725,947, filed on Oct. 11, 2005.

(51) Int. Cl.
*G06F 15/16* (2006.01)

(52) U.S. Cl.
USPC ............ 709/250; 709/217; 709/220; 709/225

(58) Field of Classification Search
USPC ................. 709/250, 217, 220, 225, 226, 227; 711/114; 710/308
See application file for complete search history.

(56) References Cited

U.S. PATENT DOCUMENTS

| | | | | |
|---|---|---|---|---|
| 5,355,453 A * | 10/1994 | Row et al. | ...................... | 709/219 |
| 5,937,169 A * | 8/1999 | Connery et al. | ............... | 709/250 |
| 6,034,963 A | 3/2000 | Minami et al. | ................. | 370/401 |
| 6,141,705 A * | 10/2000 | Anand et al. | ...................... | 710/15 |
| 6,226,680 B1 | 5/2001 | Boucher et al. | | |
| 6,247,060 B1 * | 6/2001 | Boucher et al. | ............... | 709/238 |
| 6,310,897 B1 * | 10/2001 | Watanabe et al. | .............. | 370/522 |
| 6,330,659 B1 | 12/2001 | Poff et al. | ........................ | 712/34 |
| 6,427,171 B1 * | 7/2002 | Craft et al. | ..................... | 709/230 |
| 6,647,528 B1 * | 11/2003 | Collette et al. | ................ | 714/758 |
| 6,683,883 B1 | 1/2004 | Czeiger et al. | | |
| 6,765,901 B1 | 7/2004 | Johnson et al. | ............... | 370/352 |
| 6,978,457 B1 | 12/2005 | Johl et al. | | |
| 6,983,357 B2 | 1/2006 | Poff et al. | ........................ | 712/34 |
| 6,993,644 B2 * | 1/2006 | Anand et al. | ....................... | 713/1 |
| 6,996,070 B2 * | 2/2006 | Starr et al. | ..................... | 370/252 |
| 7,039,717 B2 | 5/2006 | Johnson | ........................ | 709/237 |
| 7,089,326 B2 | 8/2006 | Boucher et al. | | |
| 7,124,205 B2 | 10/2006 | Craft et al. | | |

(Continued)

OTHER PUBLICATIONS

Bob Russell; iSCSI: Towards a more effective PDU format; Mar. 15, 2001; http://www.pdl.cmu.edu/mailinglists/ips/mail/msg03752.html.*

(Continued)

*Primary Examiner* — Abdullahi Salad
*Assistant Examiner* — Jimmy H Tran
(74) *Attorney, Agent, or Firm* — Zilka-Kotab, PC

(57) ABSTRACT

A system, method and associated data structure are provided for offloading upper protocol layer operations. In use, data is communicated over a network utilizing a plurality of protocols associated with a plurality of protocol layers, where the protocol layers include a network layer. Further, processing associated with the communicating is offloaded, at least in part. Such offloaded processing involves at least one protocol associated with at least one of the protocol layers situated at or above the network layer. Still yet, such offloading is performed statelessly.

29 Claims, 8 Drawing Sheets

(56) References Cited

U.S. PATENT DOCUMENTS

| | | | |
|---|---|---|---|
| 7,200,716 B1* | 4/2007 | Aiello | 711/114 |
| 7,206,872 B2 | 4/2007 | Chen | 710/52 |
| 7,249,306 B2 | 7/2007 | Chen | 714/758 |
| 7,260,631 B1 | 8/2007 | Johnson et al. | |
| 7,287,092 B2* | 10/2007 | Sharp | 709/245 |
| 7,287,101 B2* | 10/2007 | Futral et al. | 710/22 |
| 7,346,701 B2* | 3/2008 | Elzur et al. | 709/232 |
| 7,363,382 B1 | 4/2008 | Bakke et al. | |
| 7,379,475 B2 | 5/2008 | Minami et al. | 370/469 |
| 7,480,312 B2* | 1/2009 | Ossman | 370/469 |
| 7,535,913 B2 | 5/2009 | Minami et al. | 370/401 |
| 7,584,260 B2* | 9/2009 | Craft et al. | 709/212 |
| 7,620,726 B2* | 11/2009 | Craft et al. | 709/230 |
| 7,627,001 B2* | 12/2009 | Craft et al. | 370/469 |
| 7,761,608 B2* | 7/2010 | Rohde et al. | 709/250 |
| 7,844,743 B2* | 11/2010 | Craft et al. | 709/250 |
| 7,921,240 B2* | 4/2011 | Zur et al. | 710/52 |
| 8,065,439 B1 | 11/2011 | Johnson et al. | |
| 8,180,928 B2* | 5/2012 | Elzur et al. | 710/5 |
| 2001/0033568 A1* | 10/2001 | Spooner | 370/366 |
| 2002/0031123 A1* | 3/2002 | Watanabe et al. | 370/389 |
| 2002/0161919 A1 | 10/2002 | Boucher et al. | |
| 2003/0023933 A1* | 1/2003 | Duncan | 714/807 |
| 2003/0058870 A1 | 3/2003 | Mizrachi et al. | |
| 2003/0058938 A1* | 3/2003 | Francois et al. | 375/240.08 |
| 2003/0165160 A1 | 9/2003 | Minami et al. | 370/466 |
| 2004/0030770 A1 | 2/2004 | Pandya | |
| 2004/0037319 A1 | 2/2004 | Pandya | 370/469 |
| 2004/0042487 A1* | 3/2004 | Ossman | 370/466 |
| 2004/0044798 A1* | 3/2004 | Elzur et al. | 709/250 |
| 2004/0054814 A1* | 3/2004 | McDaniel | 709/250 |
| 2004/0062267 A1* | 4/2004 | Minami et al. | 370/463 |
| 2004/0073716 A1* | 4/2004 | Boom et al. | 709/250 |
| 2004/0078462 A1 | 4/2004 | Philbrick et al. | |
| 2004/0093411 A1* | 5/2004 | Elzur et al. | 709/224 |
| 2004/0125806 A1 | 7/2004 | Barzilai et al. | |
| 2004/0243723 A1* | 12/2004 | Davis et al. | 709/250 |
| 2004/0267967 A1* | 12/2004 | Sarangam et al. | 709/250 |
| 2005/0021874 A1* | 1/2005 | Georgiou et al. | 709/250 |
| 2005/0076287 A1* | 4/2005 | Mantong | 714/758 |
| 2005/0138180 A1 | 6/2005 | Minami et al. | 709/227 |
| 2005/0149632 A1 | 7/2005 | Minami et al. | 709/237 |
| 2006/0015651 A1* | 1/2006 | Freimuth et al. | 709/250 |
| 2006/0015655 A1* | 1/2006 | Zur et al. | 710/5 |
| 2006/0047904 A1* | 3/2006 | Rohde et al. | 711/114 |
| 2006/0098653 A1* | 5/2006 | Adams et al. | 370/389 |
| 2007/0062245 A1 | 3/2007 | Fuller et al. | |

OTHER PUBLICATIONS

Microsoft; Microsoft Windows Scalable Networking Initiative; Apr. 13, 2004; http://74.125.47.132/search?q=cache:jxy-ZOwFMQMJ:download.microsoft.com/download/5/b/5/5b5bec17-ea71-4653-9539-204a672f11cf/scale.doc+stateless+offload&cd=1&hl=en&ct=clnk&gl=us&client=firefox-a.*

M. Krueger et al., "Small Computer Systems Interface protocol over the Internet (iSCSI) Requirements and Design Considerations" The Internet Society (2002).

D. Sheinwald et al., "Internet Protocol Small Computer System Interface (iSCSI) Cyclic Redundancy Check (CRC)/Checksum Considerations" The Internet Society (2002).

J. Satran et al., Internet Small Computer Systems Interface (iSCSI) The Internet Society (2003).

M. Bakke et al., "Internet Small Computer Systems Interface (iSCSI) Naming and Discovery" The Internet Society (2004).

Non-Final Office Action from U.S. Appl. No. 11/625,137, dated Jul. 22, 2008.

Non-Final Office Action from U.S. Appl. No. 11/625,137, dated Feb. 3, 2010.

Final Office Action from U.S. Appl. No. 11/625,137, dated Feb. 18, 2009.

Final Office Action from U.S. Appl. No. 11/625,137, dated Jul. 26, 2010.

Non-Final Office Action from U.S. Appl. No. 11/625,137, dated Mar. 31, 2008.

Notice of Allowance from U.S. Appl. No. 10/742,352, dated Aug. 22, 2011.

* cited by examiner

SYSTEM, METHOD AND COMPUTER PROGRAM PRODUCT FOR STATELESS OFFLOADING OF UPPER LEVEL NETWORK PROTOCOL OPERATIONS

RELATED APPLICATION(S)

The present application is a continuation-in-part of application Ser. Nos. 10/742,352 and 10/741,681 now U.S. Pat. No. 7,260,631 filed Dec. 19, 2003, which are each incorporated herein by reference in their entirety for all purposes. The present application further claims priority from a provisional application filed Oct. 11, 2005, and which bears application Ser. No. 60/725,947, which is also incorporated herein by reference in its entirety for all purpose.

FIELD OF THE INVENTION

The present invention relates to networking, and more particularly to upper level network protocols [e.g. Internet small computer system interfaces (iSCSI), etc].

BACKGROUND

The Internet small computer system interface (iSCSI) protocol is an Internet protocol (IP)-based storage networking standard for linking data storage facilities, developed by the Internet Engineering Task Force (IETF). By carrying SCSI commands over IP networks, iSCSI is used to facilitate data transfers over intranets and to manage storage over long distances.

The iSCSI protocol is among the many technologies expected to help bring about rapid development of the storage area network (SAN) market, by increasing the capabilities and performance of storage data transmission. Because of the ubiquity of IP networks, iSCSI can be used to transmit data over local area networks (LANs), wide area networks (WANs), or the Internet and can enable location-independent data storage and retrieval.

Prior art FIG. 1 illustrates a network system 100 including both a host processor 102 and a transport offload engine 104 (i.e. TOE), in accordance with the prior art. As an option, such system 100 may be implemented in the context of the iSCSI protocol. Of course, however, such system 100 may be carried out in any desired protocol context.

In use, once communication across the network 116 is established using a connection or socket, the transport offload engine 104 receives packet data [e.g. iSCSI protocol data units (PDUs), etc.]. Once received, the transport offload engine 104 stores the data contained in the PDUs in a TOE buffer 112, in order to provide time to generate a data available message 117 and send the message to the host processor 102. The foregoing operation of the transport offload engine 104 may be governed by control logic 114 of the transport offload engine 104.

In response to a data available message 117, the host processor 102 generates a data list 106 [e.g. a scatter-gather list (SGL), memory descriptor list (MDL), etc.] that describes the location(s) in application memory 110 where the incoming data is ultimately to be stored. As shown, to accomplish this, the data list 106 may include at least one memory start address where the incoming data in each PDU is to be stored, with each start address followed by the length of a region in the application memory 110.

In use, the host processor 102 generates and associates the data list 106 with a socket (also known as a connection) associated with the received PDUs that prompted the corresponding data available message(s) 117. The incoming data contained in the PDUs is then copied from the TOE buffer 112 to the application memory 110 using the locations described by the data list 106 corresponding to that socket.

To date, the transport offload engine 104 has been utilized for offloading various lower level protocol operations. On the other hand, various operations associated with upper level network protocols (e.g. iSCSI, etc.) have been traditionally carried utilizing the host processor 102. For example, cyclical redundancy checking (CRC) and other upper level network protocol operations are typically performed by the host processor 102. By way of background, CRC provides a check value designed to catch most transmission errors. In use, a decoder calculates a CRC for received data and compares it to a CRC appended to the data. A mismatch indicates that the data was corrupted in transit.

Unfortunately, utilizing the host processor 102 for such upper level network protocol operations detrimentally affects performance of the overall system 100.

There is thus a need for overcoming these and/or other problems associated with the prior art.

SUMMARY

A system, method and associated data structure are provided for offloading upper protocol layer operations. In use, data is communicated over a network utilizing a plurality of protocols associated with a plurality of protocol layers, where the protocol layers include a network layer. Further, processing associated with the communicating is offloaded, at least in part. Such offloaded processing involves at least one protocol associated with at least one of the protocol layers situated at or above the network layer. Still yet, such offloading is performed statelessly and avoids use of state information associated with a memory descriptor list. Further still, the offloaded processing includes an insertion of markers into a data stream including the communicated data, and the markers are distinct from cyclical redundancy checking (CRC) values and are inserted as the communicated data is being transmitted, after the CRC values are calculated, such that a framing mechanism is provided which may be utilized to identify a subsequent data unit in the data stream.

BRIEF DESCRIPTION OF THE DRAWINGS

Prior art

DETAILED DESCRIPTION

Figure 2:
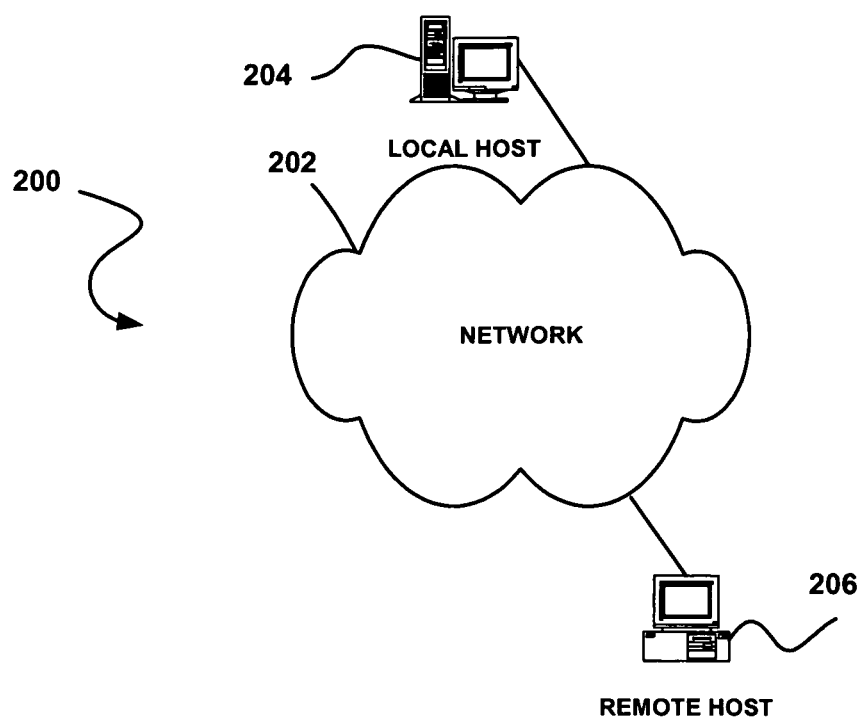
FIG. 2 illustrates a network system, in accordance with one embodiment.

FIG. 2 illustrates a network system 200, in accordance with one embodiment. As shown, a network 202 is provided. In the context of the present network system 200, the network 202 may take any form including, but not limited to a local area network (LAN), a wide area network (WAN) such as the Internet, a wireless network, etc.

Coupled to the network 202 are a local host 204 and a remote host 206 which are capable of communicating over the network 202. In the context of the present description, such hosts 204, 206 may include a web server, storage device or server, desktop computer, lap-top computer, hand-held computer, printer or any other type of hardware/software. It should be noted that each of the foregoing components as well as any other unillustrated devices may be interconnected by way of one or more networks.

Figure 3:
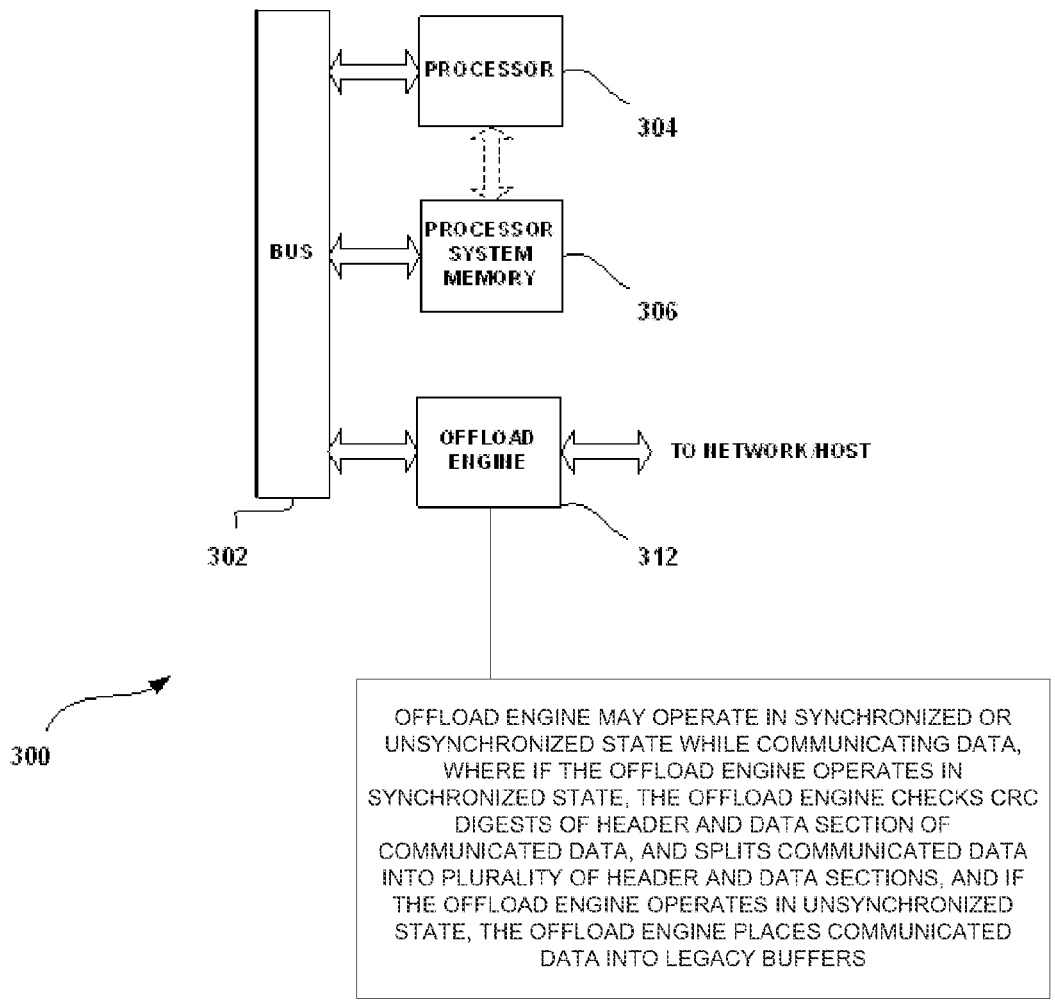
FIG. 3 illustrates an exemplary architecture in which one embodiment may be implemented.

FIG. 3 illustrates an exemplary architecture 300 in which one embodiment may be implemented. In one embodiment, the architecture 300 may represent one of the hosts 204, 206 of FIG. 2. Of course, however, it should be noted that the architecture 300 may be implemented in any desired context.

For example, the architecture 300 may be implemented in the context of a general computer system, a circuit board system, a game console system dedicated for entertainment purposes, a set-top box, a network adapter, a router, a network system, a storage system, an application-specific system, or any other desired system associated with the network 202.

As shown, the architecture 300 includes a plurality of components coupled via a bus 302. Included is at least one processor 304 for processing data. While the processor 304 may take any form, it may, in one embodiment, take the form of a central processing unit (CPU), a host processor, a chipset (i.e. a group of integrated circuits designed to work and sold as a unit for performing related functions, etc.), or any other desired processing device(s) capable of processing data.

Further included is processor system memory 306 which resides in communication with the processor 304 for storing the data. Such processor system memory 306 may take the form of on-board or off-board random access memory (RAM), a hard disk drive, a removable storage drive (e.g. a floppy disk drive, a magnetic tape drive, a compact disk drive, etc.), and/or any other type of desired memory capable of storing data. While not shown, the architecture 300 may further be equipped with a display, various input/output (I/O) devices, etc.

In use, programs, or control logic algorithms, may optionally be stored in the processor system memory 306. Such programs, when executed, enable the architecture 300 to perform various functions. Of course, the architecture 300 may simply be hardwired.

Further shown is a transport offload engine 312 in communication with the processor 304 and the network (e.g. see, for example, network 202 of FIG. 2). In one embodiment, the transport offload engine 312 may remain in communication with the processor 304 via the bus 302. Of course, however, the transport offload engine 312 may remain in communication with the processor 304 via any mechanism that provides communication therebetween. The transport offload engine 312 may include a transport (e.g. TCP/IP, iSCSI, remote direct memory access (RDMA), etc.) offload engine (TOE), system, or any integrated circuit(s) that is capable of managing the data communicated across the network.

While a single bus 302 is shown to provide communication among the foregoing components, it should be understood that any number of bus(es) (or other communicating mechanisms) may be used to provide communication among the components. Just by way of example, an additional bus may be used to provide communication between the processor 304 and processor system memory 306.

During operation, the transport offload engine 312 may be used for offloading upper protocol layer operations from the processor 304. Specifically, data may be communicated over a network utilizing a plurality of protocols associated with a plurality of protocol layers. Further, such protocol layers may include a network layer, one of various layers of the open system interconnection (OSI) model.

By way of background the OSI model includes the following seven layers of Table 1. Note that the layers toward the top of the list in Table 1 are considered upper level protocol layers while the layers toward the bottom of the list in Table 1 are considered lower level protocol layers.

TABLE 1

| Layer 7: | Application layer |
| Layer 6: | Presentation layer |
| Layer 5: | Session layer |
| Layer 4: | Transport layer |
| Layer 3: | Network layer |
| Layer 2: | Data-link layer |
| Layer 1: | Physical layer |

Further in use, processing associated with the communicating may be offloaded, at least in part. Such offloaded processing may involve at least one protocol associated with at least one of the protocol layers situated at or above the network layer.

Just by way of example, in one embodiment, the offloaded processing may involve an Internet small computer system interface (iSCSI) protocol. Further, the offloaded processing may include integrity checking such as cyclical redundancy checking (CRC), whereby the offloaded processing includes inserting a digest into the communicated data. More information regarding such exemplary embodiment of offloaded processing, as well as others, will be set forth hereinafter in greater detail during reference to subsequent figures.

In another embodiment, the offloaded processing may include direct data placement (DDP). Still yet, the offloaded processing may involve a remote direct memory access (RDMA) protocol. Even still, the offloaded processing may involve an insertion of markers into a data stream including the communicated data. While various examples of offloaded processing have been mentioned, it should be strongly noted that absolutely any processing may be offloaded which involves at least one protocol associated with at least one of the protocol layers situated at or above the aforementioned network layer (e.g. layers 3-7, etc., for example).

Figure 1:
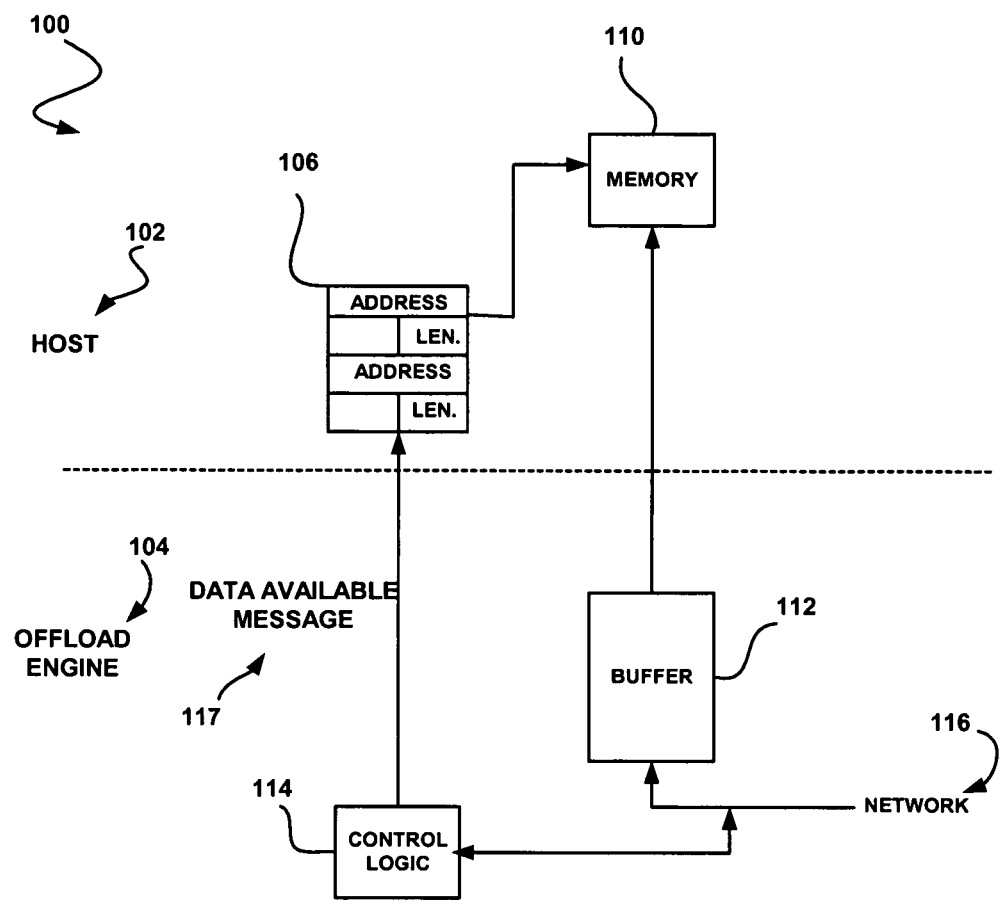
FIG. 1 illustrates a system including both a host processor and a transport offload engine, in accordance with the prior art.

It should further be noted that the aforementioned offloading is performed statelessly. In the context of the present description, stateless refers to the fact that there is substantially no use of any information regarding previous interactions during the course of at least a portion (e.g. a portion, all, etc.) of the aforementioned offloading of the upper level protocol operations. In one embodiment, for example, use of any state information associated with a data list [e.g. a scatter-gather list (SGL), memory descriptor list (MDL), see data list 106 of FIG. 1, etc.] may be avoided. Of course, it is contemplated that any stateless offloading, as defined above, may be used as desired.

More illustrative information will now be set forth regarding various optional architectures and features with which the foregoing offloading technique which may or may not be implemented, as desired. It should be strongly noted that the following information is set forth for illustrative purposes and should not be construed as limiting in any manner. Any of the following features may be optionally incorporated with or without the exclusion of other features described.

Figure 4:
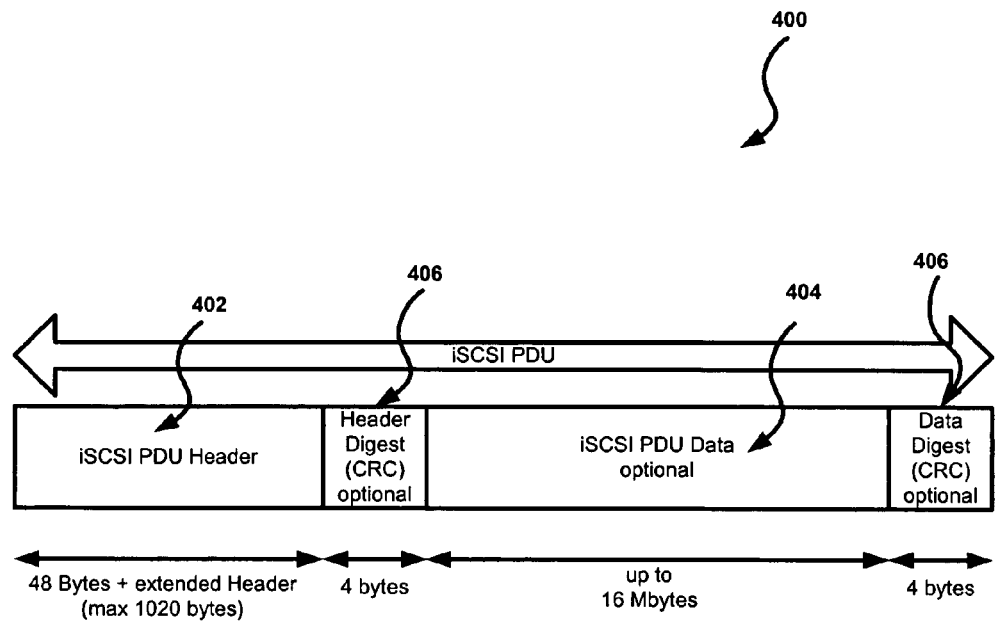
FIG. 4 illustrates an exemplary data structure associated with a protocol data unit, in accordance with one embodiment.

For example, FIG. 4 illustrates an exemplary data structure 400 associated with a protocol data unit, in accordance with one embodiment. As an option, the data structure 400 may be used in the context of the exemplary architecture 300 of FIG. 3. Of course, however, it should be noted that the data structure 400 may be implemented in any desired context.

As shown, the data structure 400 may take the form of an iSCSI protocol data unit (PDU). Such data structure 400 may include a header section 402 and a data section 404. Each of such sections 402, 404 may have a CRC digest 406, optionally appended thereto.

In one embodiment, the header section 402 may include 48 bytes in addition to any extended header information (with a maximum of 1020 bytes). Further, the data section 404 may include up to 16 Mbytes, and the CRC digest 406 may include 4 bytes. In use, the CRC digest 406 may be conditionally appended to the various sections of the data structure 400 by a transport offload engine (e.g. see transport offload engine 312 of FIG. 3, for example, etc.), in a manner that will now be described.

Figure 5:
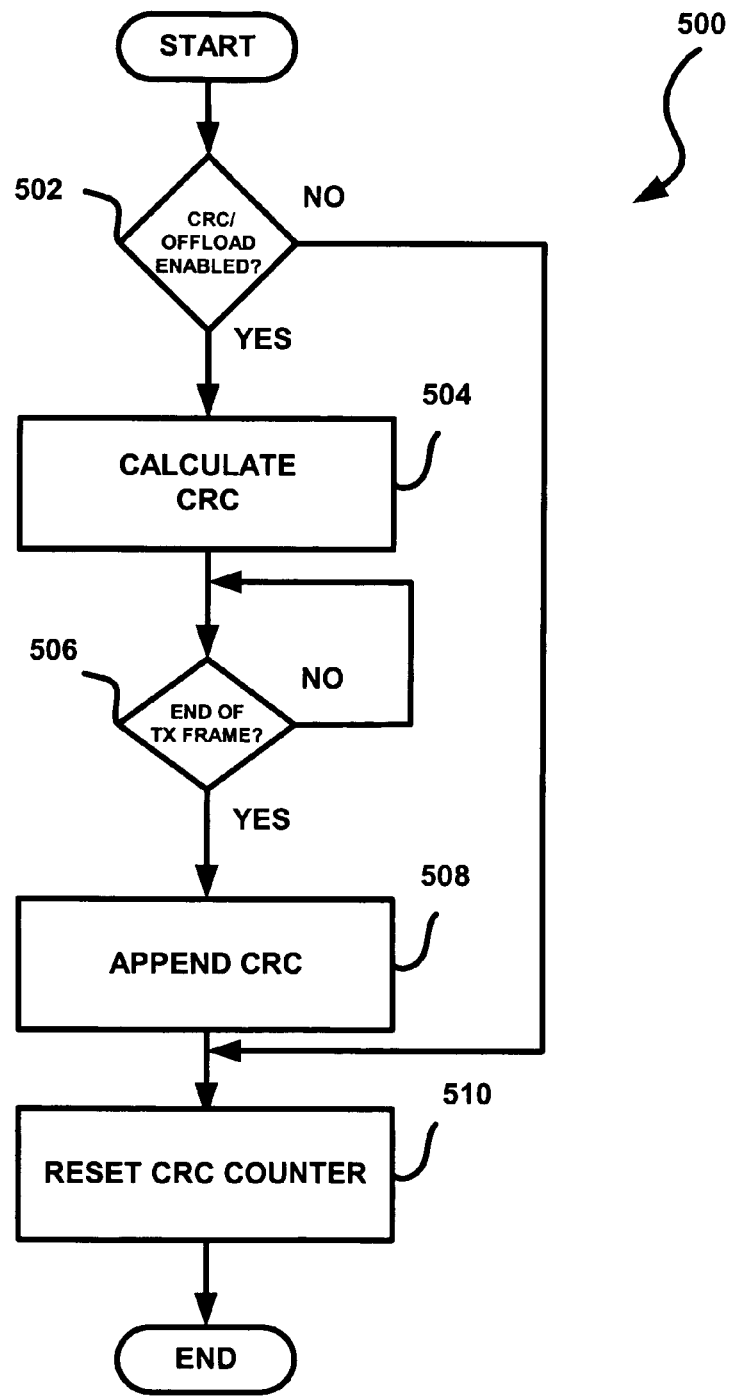
FIG. 5 illustrates an exemplary offloading method for performing integrity checking while transmitting data, in accordance with one embodiment.

FIG. 5 illustrates an exemplary offloading method 500 for performing integrity checking while transmitting data, in accordance with one embodiment. As an option, the method 500 may be used in the context of the exemplary architecture and data structure of the previous figures. Of course, however, it should be noted that the method 500 may be implemented in any desired context.

In one embodiment, the present method 500 may be implemented in the context of a transport offload engine (e.g. see, for example, the transport offload engine 312 of FIG. 3, etc.) which is adapted for incorporating large send offload (LSO) technology. With LSO technology, the work of segmenting transmitted data into network frames is performed by the transport offload engine instead of by the TCP/IP stack. With LSO, TCP/IP sends very large data packets to the transport offload engine. The transport offload engine, in turn, breaks up the data into smaller network-sized frames. This may be used to both increase the speed of high-end send operations and decrease the processor (e.g. see, for example, the processor 304 of FIG. 3, etc.) usage because the work is performed on the transport offload engine. LSO may be implemented in the TCP/IP stack, in the transport offload engine, and/or in a driver associated with the transport offload engine.

As shown in FIG. 5, it is first determined whether the offloading of CRC is enabled. Note decision 502. If so, a CRC value is calculated in operation 504. To this end, the transport offload engine operates in a plurality of modes, a first of which that does not perform CRC offloading and a second of which that does perform the CRC offloading.

In one embodiment, such CRC may be carried out by applying a 16- or 32-bit polynomial to data that is to be transmitted and appending the resulting CRC value in a digest (e.g. in the manner shown in FIG. 4, for example, etc.). Of course, any integrity checking mechanism may be employed, and it should be noted that the number of associated bytes, etc. may be altered accordingly.

In one embodiment, the CRC digest may be conditionally inserted with the transmitted data based on a predetermined bit. For example, an enable bit may be used during decision 502 to specify whether or not to insert the CRC digest at the end of a sending operation.

Next, it is determined in decision 506 as to whether the processing is at the end of a transmission frame. If so, the CRC digest is appended. Note operation 508. Thereafter, a CRC counter is reset in operation 510, so that operation may continue for subsequent data to be transmitted.

It should be noted that retransmission of any data may use the same technique. Further, such retransmission may require that, if the data retransmitted lies in the middle of a PDU section (e.g. see sections 402, 404 of FIG. 4, for example, etc.), the entire PDU section is retransmitted. This may be required in a stateless embodiment since there is not necessarily storage of the previously sent CRC value.

Figure 6:
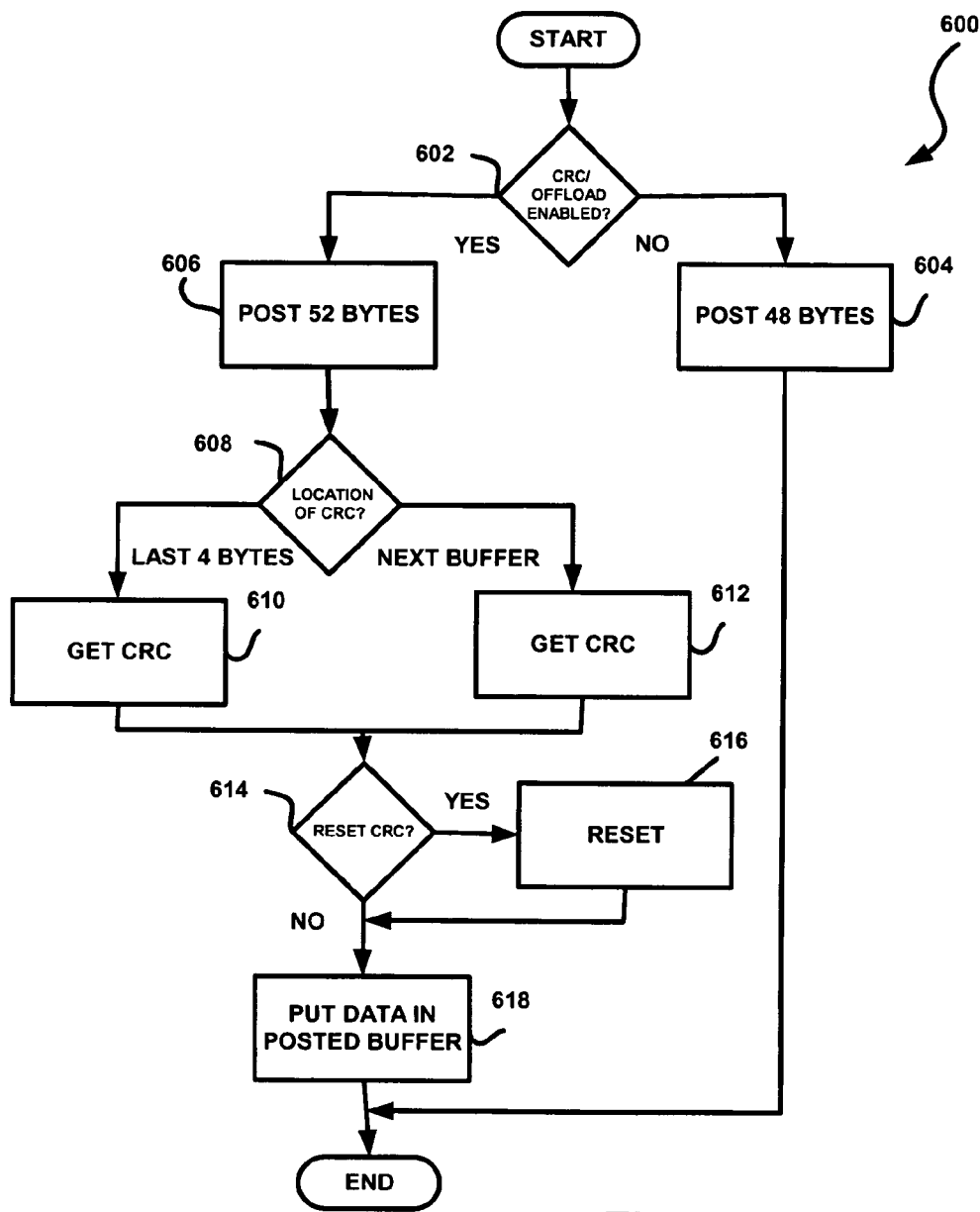
FIG. 6 illustrates an exemplary offloading method for performing integrity checking while receiving data, in accordance with one embodiment.

FIG. 6 illustrates an exemplary offloading method 600 for performing integrity checking while receiving data, in accordance with one embodiment. As an option, the method 600 may be used in the context of the exemplary architecture and data structure/method of the previous figures. Of course, however, it should be noted that the method 600 may be implemented in any desired context.

As shown, it is first determined whether the offloading of CRC is enabled. Note decision 602. As mentioned previously, an un-extended header section has 48 bytes (e.g. see header section 402 of FIG. 4, for example, etc.). Further, an un-extended header section with an appended digest has 52 (i.e. 48+4) bytes.

To this end, if it is determined in decision 602 that offloading of CRC is not enabled, only 48 bytes are posted, or allocated. See operation 604. Further, the CRC digest that is appended, if any, may be removed. Of course, if an extended header is received, additional memory may be posted.

On the other hand, if it is determined in decision 602 that offloading of CRC is enabled, 52 bytes are posted. Note operation 606. Thus, after operation 606, at least a portion of the CRC processing may be offloaded utilizing a transport offload engine (e.g. see, for example, the transport offload engine 312 of FIG. 3, etc.).

First, it is determined in decision 608 as to whether the CRC digest is contained in the last 4 bytes of the posted buffer, or whether the CRC digest is contained in the 4 bytes following the posted buffer (in which case the CRC digest is removed from the data stream). In either case, the CRC digest is retrieved accordingly in respective operations 610 and 612. In one embodiment, a first bit may be used to indicate to the transport offload engine the appropriate location of the CRC digest.

Next, it is determined whether the CRC value should be reset in operation 614. If so, the CRC value may be reset in operation 616. In one embodiment, a second bit may be used to indicate whether the CRC value should be reset before storing data in the posted buffer. Finally, the data is placed in the posted buffer in operation 618.

In one embodiment, the foregoing method 600 may operate in two states, synchronized or unsynchronized. In a synchronized state, the method 600 operates in an orderly fashion, checking the CRC digests of the header and data sections, and splitting data up into header sections and data sections. On the other hand, in an unsynchronized state, the method 600 places data into legacy buffers. An unsynchronized state may be caused by incoming data arriving out-of-order. Some transport offload engines expect data to arrive in sequence. However, once an out-of-sequence condition occurs, the pre-posted buffers may be flushed and the data may be placed into legacy buffers. The connection can also become unsynchronized if there are no buffers pre-posted to the connection, and a buffer is requested, but the processor does not respond within a certain timeframe.

Figure 7:
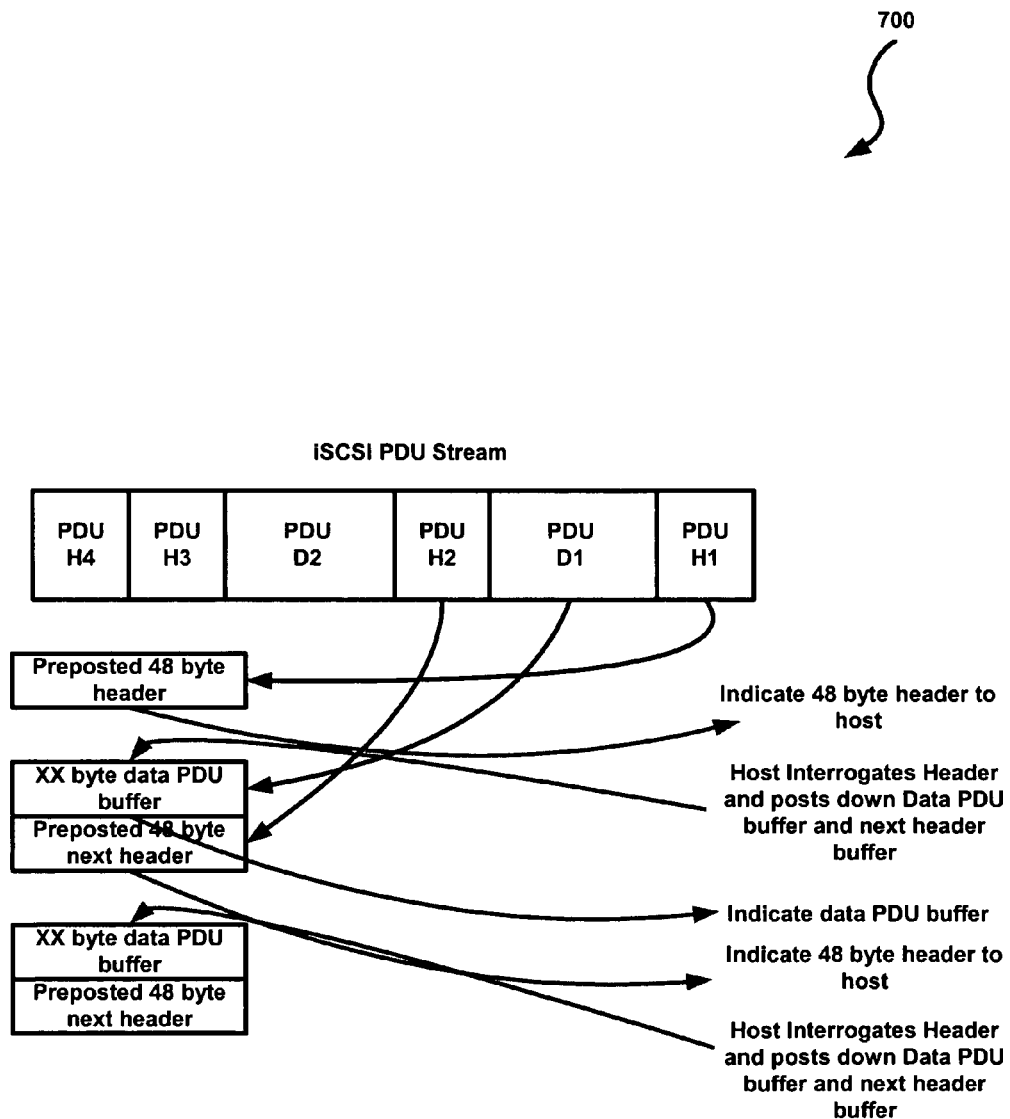
FIG. 7 shows an illustrative data stream and the manner in which sections thereof are managed upon receipt, in accordance with one embodiment.

FIG. 7 shows an illustrative data stream 700 and the manner in which sections thereof are managed upon receipt, in accordance with one embodiment. As an option, the foregoing operation may be used in the context of the method 600 of FIG. 6. Of course, however, it should be noted that the related operation may be implemented in any desired context.

As shown, a header section of a first PDU H1 is received and inserted into a pre-posted 48 byte header buffer, after which it is indicated to a processor. Subsequently, a data section of the first PDU D1 is received and inserted into a pre-posted buffer, after which the processor interrogates the associated header section H1 and posts down an appropriate buffer. Thereafter, operation continues similarly, as noted in FIG. 7.

Figure 8:
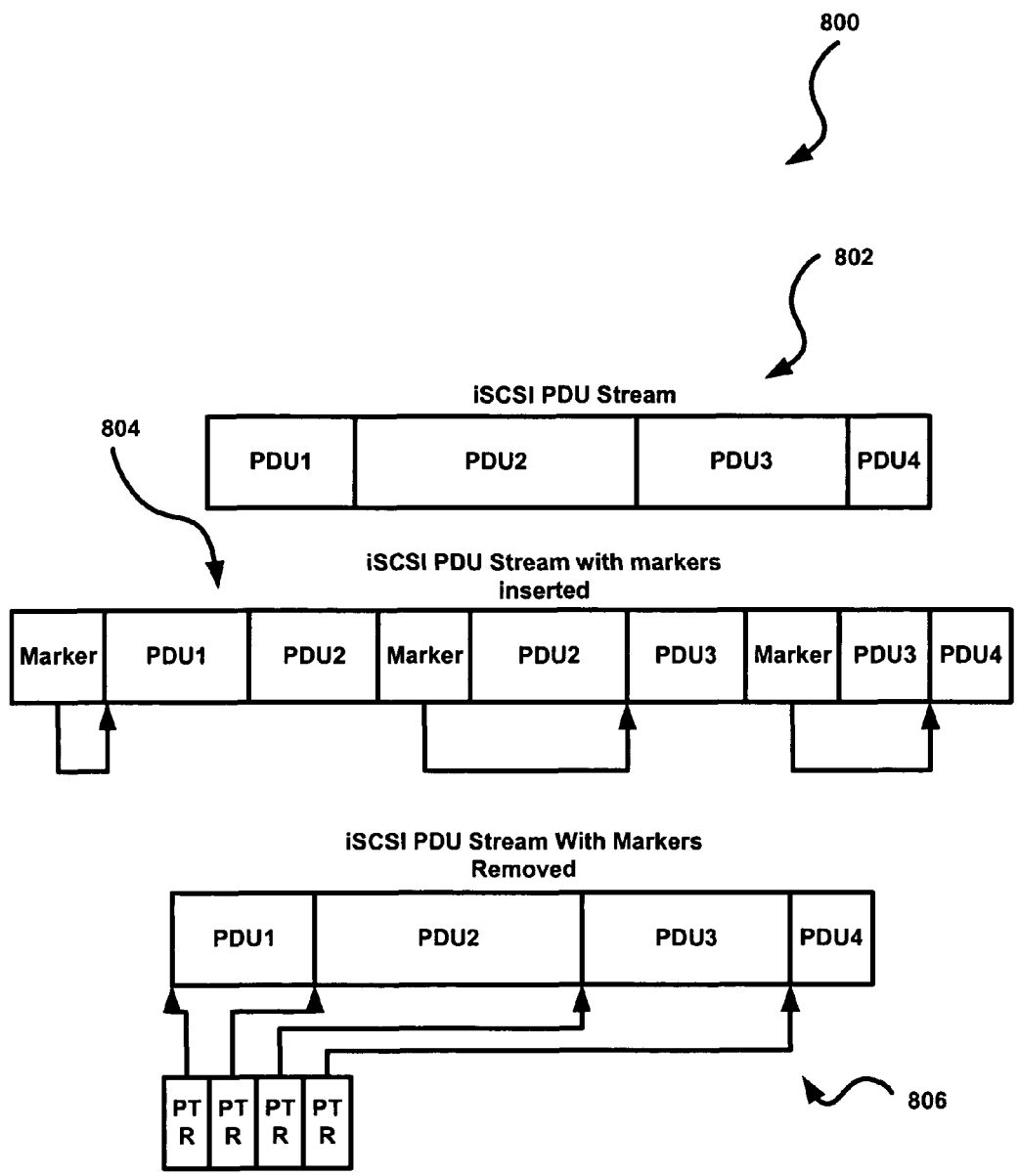
FIG. 8 illustrates exemplary data streams wherein markers are inserted during use, in accordance with one embodiment.

FIG. 8 illustrates exemplary data streams wherein markers 800 are inserted during use, in accordance with one embodiment. As an option, the foregoing marker insertion operation may be offloaded in the context of the exemplary architecture and data structure of the previous figures. Of course, however, it should be noted that the related operation may be implemented in any desired context.

As shown, a first data stream 802 is shown without markers [e.g. fixed interval markers (FIMs), etc.]. Further, a second data stream 804 is shown with markers inserted. Finally, a third data stream 806 is shown with the associated markers removed.

Use of such markers provides a framing mechanism that iSCSI may utilize to periodically point to a subsequent PDU in a TCP data stream. The markers are primarily used by a transport offload engine (e.g. see transport offload engine 312 of FIG. 3, for example, etc.) to quickly resynchronize upon an error being discovered.

The interval with which the markers are inserted may be negotiated, but fixed after negotiation. On an outgoing data stream, the markers are inserted as the data is being transmitted, after any CRC values are calculated. When the data is received, the markers are removed before any CRC calculation or data processing.

A marker includes two pointers indicating an offset to the header section of the next PDU. Each marker may be 8 bytes in length and contains two 32 bit offsets. Each 32 bit offset may include a copy of the other and may indicate how many bytes to skip in the data stream in order to find the header section of the next PDU. The marker may use the two copies of the pointer so that the marker spanning a TCP segment boundary would have at least one valid copy in one TCP segment.

In one embodiment, the markers may be inserted into the data stream at 2n intervals. Fixing the markers to a 2n interval may reduce a complexity of marker insertion by allowing markers to be inserted and deleted in out-of-order packets, and retransmitted with ease. In one embodiment, it may further be possible for a different marker interval to be used for different directions of flow, etc.

With knowledge of initial sequence numbers of a TCP connection on which markers are to operate (using the 2n interval), only two pieces of information are required, namely a marker mask and the aforementioned marker offset. With these two pieces of information, any packet can be analyzed to determine the offset into that packet where a marker exists (or needs to be inserted).

The initial sequence number may be used to generate the marker offset. Further, the marker mask may be generated by the selected 2n interval chosen. The minimum marker interval, in one embodiment, may be 128 bytes while the maximum interval may be 512K bytes.

To generate a marker in a stateless manner, the sequence number of the current TCP segment being generated can be made available, along with the number of bytes until the header section of the next PDU, and the marker offset and mask. To remove markers, the starting sequence number of the incoming TCP segment should be known, along with the marker offset and mask.

If the current sequence number (CSN) of an octet being processed matches the following formula (see Formula #1), the marker region may be found where the marker units needs to place or remove a marker octet.

$$((CSN\ \&\ Marker\ Mask) >= Marker\ Offset)\ \&\ ((CSN\ \&\ Marker\ Mask) <= Marker\ Offset+8) \quad \text{Formula \#1}$$

To this end, stateless marker insertion may be provided during transmission. While markers may be of little benefit upon receipt in some embodiments, such markers may be used in determining where a next PDU starts when encountering a defective CRC value in a header section of a PDU that also contains a defective length. A marker, in such embodiment, may allow easier error recovery by determining the location of the next PDU.

If the markers are used during receipt, the marker mask and offset may be programmed into a connection table database. The incoming TCP sequence number of the offloaded connection may then be used to extract the marker, removing it from any data indicated to the processor. The marker itself may be indicated in a receive descriptor.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An offload method, comprising:
    communicating data over a network utilizing a plurality of protocols associated with a plurality of protocol layers, the protocol layers including a network layer; and
    offloading, at least in part, processing associated with the communicating, where the offloaded processing involves at least one protocol associated with at least one of the protocol layers situated at or above the network layer;
    wherein the offloading is stateless, the stateless offloading avoiding use of state information regarding previous interactions during the course of at least a portion of the offloading of processing, wherein the state information is further associated with a memory descriptor list (MDL);
    wherein the offloaded processing includes an insertion of markers into a data stream including the communicated data;
    wherein the markers are distinct from cyclical redundancy checking (CRC) values and are inserted as the communicated data is being transmitted, after the CRC values are calculated, such that a framing mechanism is provided which may be utilized to identify a subsequent data unit in the data stream;
    wherein each of the markers is 8 bytes in length and includes two pointers, each of the two pointers indicating a 32 bit offset to a header section of a next protocol data unit (PDU), and
    wherein each of the two 32 bit offsets include a copy of the other offset and indicates how many bytes to skip in the data stream in order to find the header section of the next PDU; and
    wherein each of the markers uses the two copies of the pointers so that each of the markers spanning a TCP segment boundary would have at least one valid copy of the pointer in one TCP segment.

2. The method as recited in claim 1, wherein the offloaded processing involves an Internet small computer system interface (iSCSI) protocol.

3. The method as recited in claim 1, wherein the offloaded processing includes integrity checking.

4. The method as recited in claim 3, wherein the integrity checking includes cyclical redundancy checking (CRC).

5. The method as recited in claim 4, wherein the offloaded processing includes inserting a digest into the communicated data.

6. The method as recited in claim 5, wherein the digest is conditionally inserted into the communicated data based on a predetermined bit.

7. The method as recited in claim 5, wherein the digest includes a 4 byte CRC digest that is appended to each of a header section and a data section of the communicated data.

8. The method as recited in claim 1, wherein the offloaded processing includes direct data placement.

9. The method as recited in claim 1, wherein the offloaded processing involves a remote direct memory access (RDMA) protocol.

10. The method as recited in claim 1, wherein the markers are inserted into the data stream at 2n intervals.

11. The method as recited in claim 10, wherein a marker mask is generated using the 2n intervals, and the marker mask is necessary for determining where the markers are to be inserted into the data stream.

12. The method as recited in claim 1, wherein the network layer is one of seven layers of the open system interconnection (OSI) model.

13. The method as recited in claim 1, wherein the processing is offloaded from a processor to a transport offload engine coupled to the processor.

14. The method as recited in claim 13, wherein the transport offload engine operates in a plurality of modes.

15. The method as recited in claim 14, wherein the transport offload engine operates in a first mode during which the processing is not offloaded.

16. The method as recited in claim 15, wherein the transport offload engine operates in a second mode during which the processing is offloaded.

17. The method as recited in claim 13, wherein the transport offload engine segments the transmitted data into frames, determines if CRC is enabled, and if CRC is enabled, the transport offload engine further calculates the CRC values, determines when a processing of the frames reaches an end of a frame, appends a CRC digest to the frame, and then resets a CRC counter.

18. The method as recited in claim 13, wherein the transport offload engine operates in one of a synchronized and an unsynchronized state while communicating the data, wherein if the transport offload engine operates in the synchronized state, the transport offload engine checks CRC digests of each of a header section and a data section of the communicated data, and splits the communicated data into a plurality of header and data sections, and if the transport offload engine operates in the unsynchronized state, the transport offload engine places the communicated data into legacy buffers.

19. The method as recited in claim 1, wherein the markers are used to resynchronize upon an error being discovered.

20. The method as recited in claim 1, wherein when the communicated data is received, the markers are removed from the received data before any CRC calculation or data processing.

21. The method as recited in claim 1, wherein the markers are generated utilizing a sequence number of a current TCP segment being generated, the number of bytes until the header section of the next PDU, a marker offset, and a mask.

22. The method as recited in claim 1, wherein a marker mask and offset associated with the markers are programmed into a connection table database, where an incoming TCP sequence number of an offloaded connection associated with the communicated data is used to extract the markers from the connection table database.

23. The method as recited in claim 1, wherein the markers are utilized by a transport offload engine of a receiving device to resynchronize out of order protocol data units of the communicated data upon an error being discovered.

24. The method as recited in claim 1, wherein an interval at which the markers are inserted into the data stream is negotiated.

25. A transport offload engine sub-system, comprising:
a transport offload engine in communication with a processor and a network, the transport offload engine for: communicating data over a network utilizing a plurality of protocols associated with a plurality of protocol layers, the protocol layers including a network layer; and offloading, at least in part, processing associated with the communicating, where the offloaded processing involves at least one protocol associated with at least one of the protocol layers situated at or above the network layer;
wherein the transport offload engine sub-system is operable such that the offloading is stateless, the stateless offloading avoiding use of state information regarding previous interactions during the course of at least a portion of the offloading of processing, wherein the state information is further associated with a memory descriptor list (MDL);
wherein offloaded processing includes an insertion of markers into a data stream including the communicated data;
wherein the markers are distinct from cyclical redundancy checking (CRC) values and are inserted as the communicated data is being transmitted, after the CRC values are calculated, such that a framing mechanism is provided which may be utilized to identify a subsequent data unit in the data stream;
wherein each of the markers is 8 bytes in length and includes two pointers, each of the two pointers indicating a 32 bit offset to a header section of a next protocol data unit (PDU), and
wherein each of the two 32 bit offsets include a copy of the other offset and indicates how many bytes to skip in the data stream in order to find the header section of the next PDU; and
wherein each of the markers uses the two copies of the pointers so that each of the markers spanning a TCP segment boundary would have at least one valid copy of the pointer in one TCP segment.

26. The sub-system as recited in claim 25, wherein the sub-system is a component of a system including a bus via which the transport offload engine communicates with the processor.

27. The sub-system as recited in claim 26, wherein the system includes a display coupled to the bus.

28. The sub-system as recited in claim 26, wherein the system includes memory coupled to the bus.

29. A data structure embodied on a non-transitory computer storage medium, comprising:

a predetermined bit for enabling an offload mode for use in association with processing data utilizing a plurality of protocols associated with a plurality of protocol layers;

wherein the data structure is utilized such that, upon enablement, processing is statelessly offloaded at least in part, the stateless offloading avoiding use of state information regarding previous interactions during the course of at least a portion of the offloading of processing, wherein the state information is further associated with a memory descriptor list (MDL), where the offloaded processing involves at least one protocol associated with at least one of the protocol layers situated at or above a network layer;

wherein the data structure is utilized such that, upon enablement, the offloaded processing includes an insertion of markers into a data stream including the communicated data;

wherein the data structure is utilized such that, upon enablement, the markers are distinct from cyclical redundancy checking (CRC) values and are inserted as the communicated data is being transmitted, after the CRC values are calculated, such that a framing mechanism is provided which may be utilized to identify a subsequent data unit in the data stream;

wherein the data structure is utilized such that, upon enablement, each of the markers is 8 bytes in length and includes two pointers, each of the two pointers indicating a 32 bit offset to a header section of a next protocol data unit (PDU), and wherein each of the two 32 bit offsets include a copy of the other offset and indicates how many bytes to skip in the data stream in order to find the header section of the next PDU; and wherein each of the markers uses the two copies of the pointers so that each of the markers spanning a TCP segment boundary would have at least one valid copy of the pointer in one TCP segment.

\* \* \* \* \*